(12) United States Patent
François et al.

(10) Patent No.: US 8,446,956 B2
(45) Date of Patent: May 21, 2013

(54) INTER-LAYER MOTION PREDICTION METHOD USING RESAMPLING

(75) Inventors: Edouard François, Bourg des Comptes (FR); Vincent Bottreau, Chateaubourg (FR); Patrick Lopez, Livre sur Changeon (FR); Jérôme Vieron, Bedee (FR); Ying Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 810 days.

(21) Appl. No.: 12/087,349

(22) PCT Filed: Dec. 18, 2006

(86) PCT No.: PCT/EP2006/069852
§ 371 (c)(1),
(2), (4) Date: Apr. 3, 2009

(87) PCT Pub. No.: WO2007/077116
PCT Pub. Date: Jul. 12, 2007

(65) Prior Publication Data
US 2009/0225846 A1    Sep. 10, 2009

(30) Foreign Application Priority Data
Jan. 5, 2006  (EP) .................... 06290049

(51) Int. Cl.
*H04N 7/12*    (2006.01)
(52) U.S. Cl.
USPC .................................... 375/240.16
(58) Field of Classification Search ............ 375/240.01–240.11; *H04N 7/12*
See application file for complete search history.

(56) References Cited

U.S. PATENT DOCUMENTS
5,831,678 A    11/1998    Proctor
(Continued)

FOREIGN PATENT DOCUMENTS
EP    0577337    1/1994
(Continued)

OTHER PUBLICATIONS

J. Reichel et al: "Joint Scalable Video Model JSVM-4" Joint Video Team (JVT) of ISO/IEC MPEG 8, ITU-T VCEG . . . ; Oct. 31, 2005, pp. 1-41 XP002372058.
(Continued)

*Primary Examiner* — David Czekaj
*Assistant Examiner* — Tracy Li
(74) *Attorney, Agent, or Firm* — Robert D. Shedd; Jeffrey M. Navon

(57) ABSTRACT

The invention relates to a method for generating for at least one macroblock of a high resolution image at least one motion predictor from motion data associated to macroblock(s) of a low resolution image. The method comprises the following steps: —defining a virtual structure made up of non overlapping macroblocks, called virtual base layer macroblocks; —identifying for the high resolution macroblock corresponding virtual base layer macroblocks in the virtual image on the basis of the location of the high resolution macroblock within the high resolution image and on the basis of the ratios of low resolution and high resolution images dimensions; —deriving, for each identified virtual base layer macroblocks, motion data from motion data associated to at least one macroblock of a corresponding low resolution macroblocks pair on the basis of the field/frame mode of the corresponding low resolution macroblocks pair and on the basis of the field/frame mode of the high resolution macroblock; —resampling motion data associated to the corresponding virtual base layer macroblocks so as to generate the at least one motion predictor.

9 Claims, 10 Drawing Sheets

U.S. PATENT DOCUMENTS

| | | | |
|---|---|---|---|
| 5,978,509 | A | 11/1999 | Nachtergaele et al. |
| 6,233,283 | B1 | 5/2001 | Chiu et al. |
| 6,400,768 | B1 * | 6/2002 | Nagumo et al. ......... 375/240.18 |
| 6,510,177 | B1 | 1/2003 | De Bonet et al. |
| 6,580,832 | B1 | 6/2003 | Kim et al. |
| 6,639,943 | B1 | 10/2003 | Radha et al. |
| 6,690,724 | B1 | 2/2004 | Kadono |
| 6,728,317 | B1 * | 4/2004 | Demos ..................... 375/240.21 |
| 6,741,748 | B1 | 5/2004 | Son et al. |
| 6,957,350 | B1 | 10/2005 | Demos |
| 6,980,667 | B2 | 12/2005 | Hamanaka |
| 7,477,690 | B2 * | 1/2009 | Wang et al. ............... 375/240.15 |
| 7,777,812 | B2 * | 8/2010 | Sun ................ 348/448 |
| 2001/0012322 | A1 | 8/2001 | Nagaoka et al. |
| 2002/0001411 | A1 | 1/2002 | Suzuki et al. |
| 2002/0009141 | A1 | 1/2002 | Yamaguchi et al. |
| 2002/0051581 | A1 | 5/2002 | Takeuchi et al. |
| 2002/0150158 | A1 | 10/2002 | Wu et al. |
| 2003/0012279 | A1 | 1/2003 | Chaddha |
| 2003/0169932 | A1 | 9/2003 | Li et al. |
| 2004/0202250 | A1 | 10/2004 | Kong et al. |
| 2004/0264791 | A1 | 12/2004 | Jiang et al. |
| 2005/0008079 | A1 | 1/2005 | Boon et al. |
| 2005/0030205 | A1 | 2/2005 | Konoshima et al. |
| 2005/0129122 | A1 | 6/2005 | Booth et al. |
| 2005/0175101 | A1 | 8/2005 | Honda et al. |
| 2005/0207492 | A1 | 9/2005 | Pao |
| 2006/0012719 | A1 | 1/2006 | Karczewicz et al. |
| 2006/0083308 | A1 * | 4/2006 | Schwarz et al. ......... 375/240.16 |
| 2006/0126734 | A1 | 6/2006 | Wiegand et al. |
| 2006/0133475 | A1 | 6/2006 | Bruls et al. |
| 2006/0133510 | A1 | 6/2006 | Saxena et al. |
| 2006/0140269 | A1 | 6/2006 | Bruls |
| 2006/0176955 | A1 | 8/2006 | Lu et al. |
| 2006/0221418 | A1 | 10/2006 | Lee et al. |
| 2006/0222070 | A1 * | 10/2006 | Park et al. ................. 375/240.08 |
| 2007/0230914 | A1 | 10/2007 | Garrido et al. |

FOREIGN PATENT DOCUMENTS

| | | |
|---|---|---|
| EP | 0883300 | 12/1998 |
| EP | 1811786 | 7/2007 |
| JP | 06133290 | 5/1994 |
| JP | 06209468 A | 7/1994 |
| JP | 11018085 | 1/1999 |
| JP | 2000013790 | 1/2000 |
| JP | 2001500674 | 1/2001 |
| JP | 06209468 | 7/2001 |
| JP | 2003531514 | 10/2003 |
| JP | 2007081983 | 3/2007 |
| JP | 2008536440 | 9/2008 |
| WO | WO9728507 | 8/1997 |
| WO | WO-0177871 | 10/2001 |
| WO | WO2004080079 | 9/2004 |
| WO | WO2006110013 | 10/2006 |

OTHER PUBLICATIONS

S.J. Wee Et All: "Field-to-Frame Transcoding With Spatial and Temporal Downsampling", Image Processing, 1999, ICIP 99. Proceedings 1999, Int'l Conference on Kobe, Japan Oct. 24-28, 1999, vol. 4, pp. 271-275, XP010368707.

Search Report Dated Mar. 8, 2007.

J. Vieron et al. "CE4: Inter-layer prediction for interlace/progressive SVC" Joint Video Team (JVT) of ISO/IEC MPEG & ITU-T VCEG (ISO/IEC JTC1/SC29/WG11 and ITU-T SG16 Q6), 19th Meeting Geneva, Switzerland, Apr. 1-7, 2006, pp. 1-16, XP002410927.

E. Francois et al. "Extended spatial scalability with a 3/2 size ratio" ISO/IEC JTC1/WG11 MPEG2005/M11958, Apr. 13, 2005, pp. 1-34, XP002383335, Busan.

Reichel et al. "Joint Scalable Video Model JSVM-5" Joint Video Team of ISO/IEC MPEG & ITU MPEG & ITU-T VCEG (ISO/IEC JTC1/SC29/WG11 and ITU-T SG16 Q.6) Switzerland Apr. 7, 2006. "Description of core exeriments in SVC", SO/IEC JTC1/SC29/WG11/N6898, XP002340411, Hong Kong (Jan. 2005).

Reichel et al., "Joint Scalable Video Model JSVM-1.0 Reference Encoding Algorithm Description" JTC1/SC29/WG11 and ITU-T SG16 06, N6899 Jan. 2005 pp. 1-39.

Reichel et al., "Joint Scalable Video Model JSVM-2", Joint Video Team of ISO/IEC MPEG&ITU-T VCEG, Apr. 22, 2005, pp. 1-31.

Reichel et al., "Joint Scalable Video Model JSVM-0", Joint Video Team of ISO/IEC MPEG&ITU-T VCEG, Jan. 17, 2005, pp. 1-73.

Francois, et al., "Generic Extended Spatial Scalability", Joint Video Team (JVT) fo ISO/IEC MPEG 7 ITU-T VCEG (ISO/IEC JTC1/SC 29/WG 13th Meeting, Spain Oct. 22, 2004.

* cited by examiner (a) 16x16 case          (b) 16x8 case (c) 8x16 case          (d) example of 8x8 case

INTER-LAYER MOTION PREDICTION METHOD USING RESAMPLING

This application claims the benefit, under 35 U.S.C. §365 of International Application PCT/EP2006/069852, filed Dec. 18, 2006, which was published in accordance with PCT Article 21(2) on Jul. 12, 2007 in English and which claims the benefit of European patent application No. 06290049.3, filed Jan. 5, 2006.

1. FIELD OF THE INVENTION

The invention relates to a method for generating for blocks of pixels of images of a high resolution sequence at least one motion predictor from motion data associated to blocks of pixels of images of a low resolution sequence.

2. BACKGROUND OF THE INVENTION

State-of-art scalable hierarchical coding methods allow to encode the information hierarchically in order that it can be decoded at different resolution and/or quality levels. A data stream generated by a scalable coding device is thus divided into several layers, a base layer and one or more enhancement layers. These devices allow to adapt a unique data stream to variable transmission conditions (bandwidth, error rate . . . ) and also to the capacities of reception devices (CPU, characteristics of reproduction device . . . ). A spatially scalable hierarchical encoding (or decoding) method encodes (or decodes) a first part of data called base layer relating to low resolution images also called base layer images (BL images), and from this base layer encodes (or decodes) at least another data part called enhancement layer relating to high resolution images also called enhancement layer images (EL images). The coding information or coding data relating to enhancement layer is possibly inherited (i.e. derived) from coding information relating to the base layer by a method called inter-layer prediction method or inter-layer inheriting method. Each macroblock of a high resolution image is thus temporally predicted according to a classical prediction mode (e.g. bidirectional prediction mode, direct prediction mode, forward/backward prediction . . . ) or is predicted according to an inter-layer prediction mode. In this former case, motion information/data associated to a high resolution macroblock (e.g. partitioning pattern associated to macroblock/block of pixels of the high resolution image (for splitting said macroblock/block into several sub-blocks), coding modes associated to said blocks, possibly motion vectors and one or more image reference indices associated to some blocks allowing to reference the image used to predict said block) has to be derived or inherited from motion data associated to macroblocks of low resolution images whatever the format of the low or high resolution images is, i.e. progressive or interlaced.

3. SUMMARY OF THE INVENTION

The invention relates to a method, as part of a process of coding or decoding video signal, for generating for at least one macroblock of a high resolution image, called high resolution macroblock, at least one motion predictor from motion data associated to macroblock(s) of a low resolution image, called low resolution macroblock(s). The method comprises the following steps:
  defining a virtual structure made up of non overlapping macroblocks, called virtual base layer macroblocks, the virtual structure having same dimensions as the low resolution image;
  identifying for the high resolution macroblock corresponding virtual base layer macroblocks in the virtual image on the basis of the location of the high resolution macroblock within the high resolution image and on the basis of the ratios of low resolution and high resolution images dimensions;
  deriving, for each identified virtual base layer macroblocks, motion data from motion data associated to at least one macroblock of a corresponding low resolution macroblocks pair on the basis of the field/frame mode of the corresponding low resolution macroblocks pair and on the basis of the field/frame mode of the high resolution macroblock;
  resampling motion data associated to the corresponding virtual base layer macroblocks so as to generate the at least one motion predictor.

If the high resolution macroblock is in frame mode and if the corresponding low resolution macroblocks pair is in field mode, the deriving step comprises the steps of:
  upsampling vertically by a ratio of two the low resolution macroblocks pair made up of a top macroblock and a bottom macroblock, each upsampled macroblock being made up of an up part and a down part; and
  merging motion data of the up part of the upsampled top macroblock with motion data of the up part of the upsampled bottom macroblock and merging motion data of the down part of the upsampled top macroblock with motion data of the down part of the upsampled bottom macroblock.

If the high resolution macroblock is in field mode and if the corresponding low resolution macroblocks pair is in frame mode, the deriving step comprises a step for downsampling vertically by a ratio of two motion data associated to the corresponding low resolution macroblocks pair.

The invention also relates to a device for coding a sequence of high resolution images made up of macroblocks, called high resolution macroblocks, and a sequence of low resolution images, called low resolution macroblocks. The device comprises:
  first coding means for coding the low resolution images, the first coding means generating motion data for macroblocks of the low resolution images and a base layer data stream;
  inheritance means for deriving motion data for at least one macroblock of a high resolution image, called high resolution macroblock from motion data of macroblocks a low resolution image, called low resolution macroblocks; and
  second coding means for coding the high resolution images using the derived motion data, the second coding means generating an enhancement layer data stream.

The inheritance means comprise:
  means for defining a virtual structure made up of non overlapping macroblocks, called virtual base layer macroblocks, the virtual structure having same dimensions as the low resolution image;
  means for identifying for the high resolution macroblock corresponding virtual base layer macroblocks in the virtual image on the basis of the location of the high resolution macroblock within the high resolution image and on the basis of the ratios of low resolution and high resolution images dimensions;
  means for deriving, for each identified virtual base layer macroblocks, motion data from motion data associated to at least one macroblock of a corresponding low resolution macroblocks pair on the basis of the field/frame mode of the corresponding low resolution macroblocks pair and on the basis of the field/frame mode of the high resolution macroblock; and means for resampling motion data associated to the corresponding virtual base layer macroblocks so as to generate the at least one motion predictor.

According to a specific embodiment, the first coding means are an MPEG-4 AVC video encoder.

The invention also relates to a device for decoding at least a coded sequence of high resolution images, the coded images arising in the form of a data stream, each image being divided in non overlapping macroblocks. The device comprising:

first decoding means for decoding at least a first part of the data stream in order to generate low resolution images and motion data for macroblocks of the low resolution image;

inheritance means for deriving motion data for at least one macroblock of a high resolution image from motion data of macroblocks of a low resolution image; and second decoding means for decoding at least a second part of the data stream using the derived motion data in order to generate high resolution images.

The inheritance means comprise:

means for defining a virtual structure made up of non overlapping macroblocks, called virtual base layer macroblocks, the virtual structure having same dimensions as the low resolution image;

means for identifying for the high resolution macroblock corresponding virtual base layer macroblocks in the virtual image on the basis of the location of the high resolution macroblock within the high resolution image and on the basis of the ratios of low resolution and high resolution images dimensions;

means for deriving, for each identified virtual base layer macroblocks, motion data from motion data associated to at least one macroblock of a corresponding low resolution macroblocks pair on the basis of the field/frame mode of the corresponding low resolution macroblocks pair and on the basis of the field/frame mode of the high resolution macroblock;

means for resampling motion data associated to the corresponding virtual base layer macroblocks so as to generate the at least one motion predictor.

According to a specific embodiment, the first decoding means are an MPEG-4 AVC video decoder.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE PREFERRED EMBODIMENTS

In the SVC standard currently defined by JVT (MPEG & ITU) in the document JVT-Q202 from ISO/IEC MPEG & ITU-T VCEG entitled <<Scalable Video Coding—Joint Draft 4>> and referenced as JSVM4 in the sequel, the spatial scalability is only considered for progressive material. Motion inter-layer prediction between two (or more) successive spatial layers (the base one and enhancement one(s)) are only addressed in case of progressive video sequences. The invention proposes to extend these inter-layer prediction processes in order to support any combinations of interlace/progressive scalability.

Figure 1:
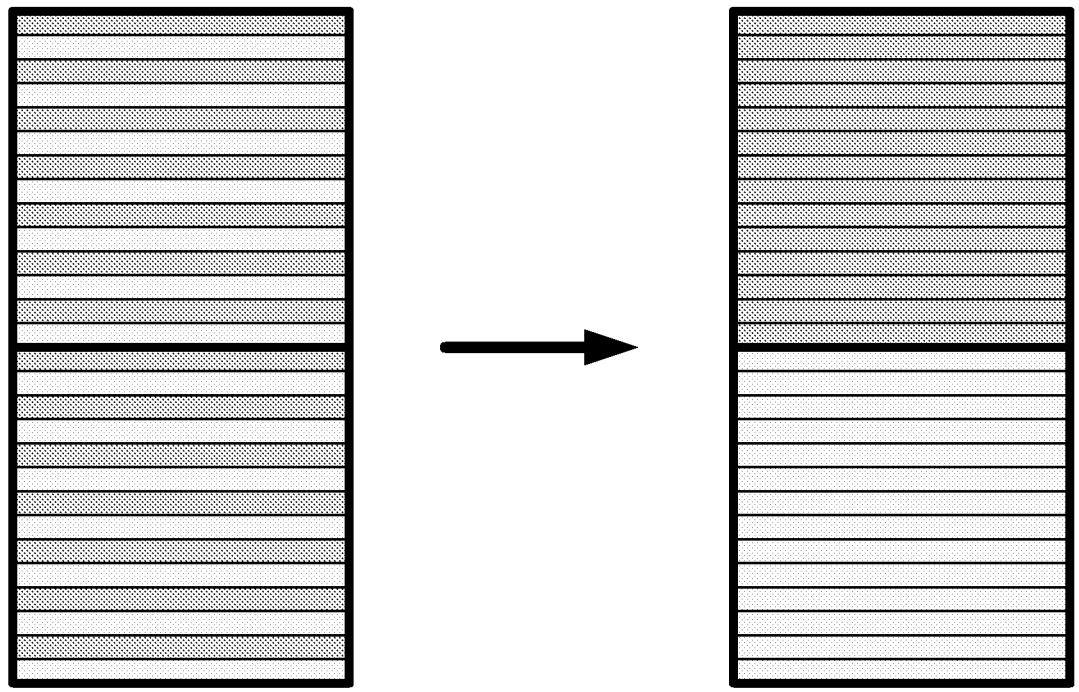
FIG. 1 depicts a pair of macroblocks located vertically and coded either in frame mode (left part of the figure) or in field mode (right part of the figure)

According to many video coding standards an interlaced image, which comprises a top field interlaced with a bottom field captured at different time instant, may be coded either as two field images (field image mode), i.e. the two fields of the image are coded separately, or as a frame image (frame image mode), i.e. the image is coded as a single frame. MPEG-4 AVC described in the document ISO/IEC JTC 1/SC 29/WG 11 N5546 entitled <<Text of 14496-2 Third Edition>> allows that decision to be made either independently for the entire image or independently for every two vertical macroblock-pair. When the decision is made at image level it is called PAFF coding (PAFF stands for Image Adaptative Frame/Field) and when the decision is made at macroblock-pair level it is called MBAFF (stands for Macroblock Adaptative Frame/Field). More precisely, according to MPEG-4 AVC, when an interlaced image is encoded as a frame image and if MBAFF is allowed, then each pair of vertical macroblocks (MBs) may be encoded as interlaced, i.e. field mode (right part of the FIG. 1), or as progressive, i.e. frame mode (left part of the FIG. 1). On FIG. 1, the grey lines represent the even lines of the images interlaced with the odd lines, i.e. the white lines, of the images. When a pair of vertical macroblocks is in field mode, each MB of the pair is said to be a field macroblock. When a pair of vertical macroblocks is in frame mode, each MB of the pair is said to be a frame macroblock.

The method according to the invention allows to generate at least one inter-layer motion predictor for a macroblock of the high resolution image (also called Enhancement Layer MacroBlock and noted EL MB) from motion data associated to some macroblocks of the low resolution images (also called Base Layer MacroBlock and noted BL MB) whatever the format (interlace or progressive) of the high and low resolution sequences. An inter-layer motion predictor, more simply called motion predictor, associated to a macrocblock of a high resolution image is a macroblock to which is associated motion data (e.g. partition/sub-partition type, possibly reference indices allowing to identify reference images, motion vectors . . . ). According to MPEG-AVC, for each image of a sequence of images, the reference indices are selected among two reference lists (list0 et list1) defined as follows:

each reference index is associated to a given reference image number;

for each list, some reference indices are marked as invalid; and each 8×8 block, i.e. block of size 8 by 8 pixels, can use for each list a single reference index.

An invalid reference index corresponds to reference fields or frames not yet available (decoded) in the decoding process.

The motion predictor is generated using a motion downsampling method as the ESS (stands for Extended Spatial Scalability) method described in the JSVM4 document. If the high resolution image under consideration is interlaced, then two inter-layer prediction modes are potentially available to encode or decode each EL macroblock:

1. inter-layer interlace (IL_I) mode: macroblock corresponding to TOP or BOTTOM field data, i.e. a field macroblock.
2. inter-layer progressive (IL_P) mode: macroblock corresponding to FRAME data. i.e. a frame macroblock.

Figure 17:
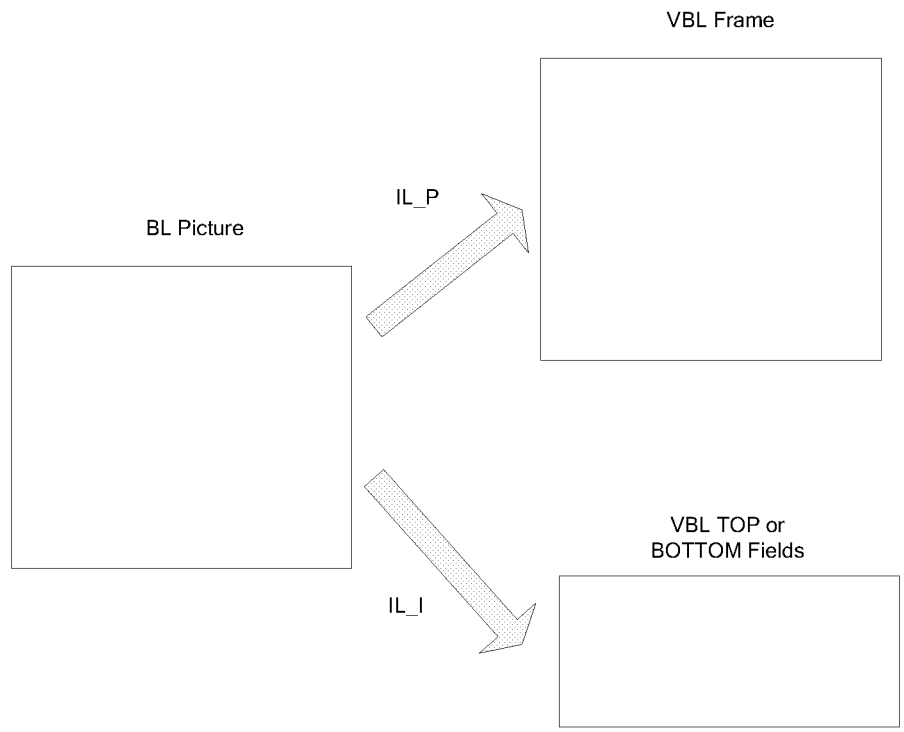
FIG. 17 depicts virtual base layer structures.

The invention proposes a method for generating these inter-layer macroblock predictors. To this aim the invention consists in defining at step 190 "Virtual Base Layer" (VBL) macroblocks from the BL MBs instead of modifying in depth the method described in JSVM4. A "Virtual Base Layer" (VBL) macroblock is a structure to which motion data is associated. The use of VBL structures avoids or at least significantly limits the JSVM4 upsampling process modifications, since most of the issues related to interlace are reported in the VBL data derivation. Indeed, "Virtual Base Layer" (VBL) macroblocks ensure the compatibility between BL and EL macroblocks and facilitates the direct re-use of inter-layer prediction defined in JSVM4 for progressive images. Instead of applying the resampling process directly to the BL macroblocks, BL macroblocks are first converted into VBL macroblocks that all have a field/frame mode compatible with the EL macroblock field/frame mode. Practically, this method requires the use of the following structures: a VBL Frame (with same dimension as BL Images), a VBL TOP field and a VBL BOTTOM field (with same width as BL Images and half height as BL Images) forming a VBL Field with same dimensions as BL image, as illustrated in FIG. 17. Each VBL structure is divided into macroblocks called VBL Frame MBs, VBL TOP field MBs, and VBL BOTTOM field MBs to which motion data is associated. The classical ESS downsampling method described in JSVM4 for deriving motion information for MBs of high resolution images from BL MBs is then applied using the VBL MBs instead of the original BL MBs. The inter-layer motion prediction method may be part of a process for coding sequence of images and part of a process for decoding sequence of images. In an encoding process, all potential inter-layer motion predictors are computed. The encoding process then selects to encode current EL MB using either an inter-layer prediction mode, or a classical prediction mode. If an inter-layer prediction mode is selected by the encoding process, then only the corresponding inter-layer predictor is computed by the decoding process.

Figure 2:
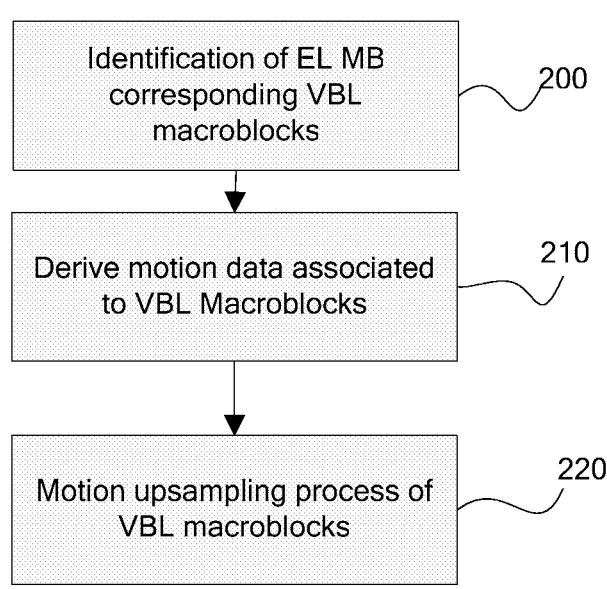
FIG. 2 depicts a flowchart of the method according to the invention.

In reference to FIG. 2, the inter-layer motion prediction process for a current EL MB whose inter-layer mode IL_mode is either IL_P, i.e. frame mode, or IL_I, i.e. field mode, achieves the following steps:

Identify 200 the corresponding VBL macroblocks {c0, c1, . . . cN} for each corresponding VBL macroblock ci, i=0 . . . N, positioned at (xi,yi), derive 210 the associated motion data from motion data associated to BL macroblocks depending on the inter-layer prediction mode, and derive 220 of the inter-layer motion predictor from respectively VBL MBs, using the ESS process as described in JSVM4 with a ratio equal to $h_{enh}/h_{base}$ in the vertical direction and a ratio equal to $w_{enh}/w_{base}$ in the horizontal direction, where $h_{enh}$ is the height and $w_{enh}$ the width of the HL pictures and where $h_{base}$ is the height and $w_{base}$ the width of the BL picture.

The inter-layer mode IL_mode at the decoding side is derived from the bitstream. At the encoding side this mode is derived by a coding mode decision method. Such a method is for example based on a posteriori criteria, i.e. it selects the mode that minimizes a linear combination of the distortion and of the coding cost.

Figure 18:
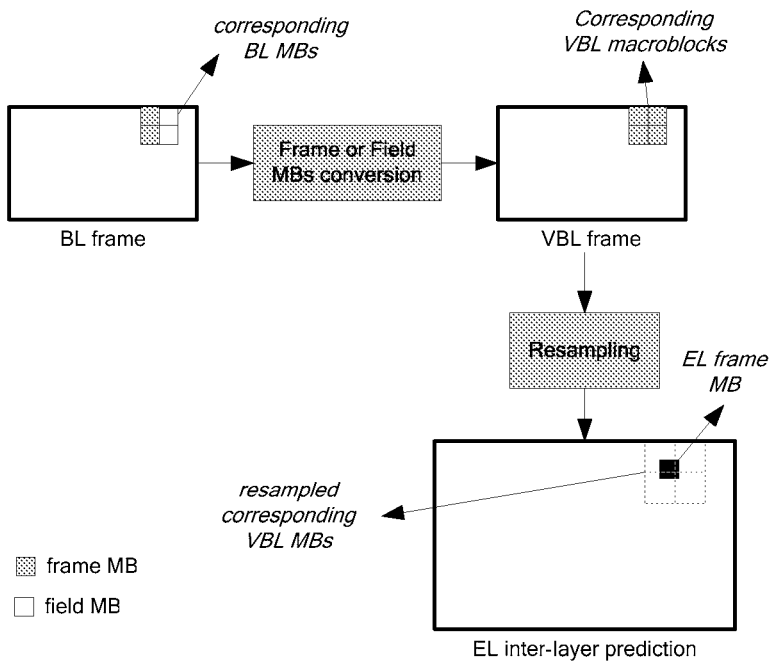
FIG. 18 depicts the inter-layer prediction process of a given EL MB according to the invention.

FIG. 18 illustrates as an example the inter-layer motion prediction process in a case where the low resolution image is interlaced and encoded as a frame image in MBAFF mode and where the high resolution image is interlaced and encoded as a frame image in MBAFF mode. Given an EL macroblock (filled in black, and considered as a frame macroblock in this example), its corresponding VBL macroblocks are first identified. The corresponding BL macroblocks may be of different frame/field mode than the EL macroblock. For example, on FIG. 18, the right pair of BL macroblocks is made up of two field macroblocks while the EL macroblock is in frame mode. In this case motion data associated to BL macroblocks is converted. This converted motion data information is therefore associated to VLB macroblocks which have the same frame/field mode as the EL macroblock. Finally, inter-layer prediction is performed from VBL macroblocks to EL macroblock using the 'standard' progressive resampling process described in JSVM4.

Frame-Field macroblocks conversion is required in the following cases.

Case 1: BL and EL frames are encoded with MBAFF mode, EL MB is field coded and corresponding BL MBs are frame coded. This requires frame-to-field conversion.

Case 2: The EL MB is frame coded, the BL is a frame image and corresponding BL MBs are field coded. In that case, field-to-frame conversion is required.

Case 3: BL image is progressive frame; EL MB is field coded in a frame image or belongs to a field image; and the EL field height $H_e/2$ is lower than the BL frame height $H_b$. In that case, frame-to-field conversion is required.

The step 200 consist in identifying the corresponding VBL macroblocks {c0,c1, . . . cN}. If EL MB mode is IL_P, i.e. VBL Frame MBs are used, then the corresponding VBL MBs will be determined using the following process:

$$xs = \lfloor x * w_{base}/w_{enh} \rfloor / 16$$

$$ys = \lfloor y * h_{base}/h_{enh} \rfloor / 16$$

$$xe = \lfloor (x+15) * w_{base}/w_{enh} \rfloor / 16$$

$$ye = \lfloor (y+15) * h_{base}/h_{enh} \rfloor / 16$$

where (x,y) are the top left sample position of the EL MB under consideration, ($w_{base}$, $h_{base}$) the base images dimensions and ($w_{enh}$, $h_{enh}$) the enhancement images dimensions. The corresponding VBL macroblocks {c0,c1 ... cN} are those located inside window delimited by top left position (xs,ys) and bottom right position (xe,ye).

If EL MB mode is IL_I, i.e. VBL TOP or BOTTOM Field MBs are used, then corresponding VBL MBs will be determined using the following process:

$$xs=[(x-x_0)*w_{base}/w_{enh}]/16$$

$$ys=[(y-y_0)*(h_{base}/2)/h_{enh}]/16$$

$$xe=[(x+15-x_0)*w_{base}/w_{enh}]/16$$

$$ye=[(y+5-y_0)*(h_{base}/2)/h_{enh}]/16$$

The corresponding VBL macroblocks {c0,c1, ... cN} are those located inside window delimited by top left position (xs,ys) and bottom right position (xe,ye).

Figure 3:
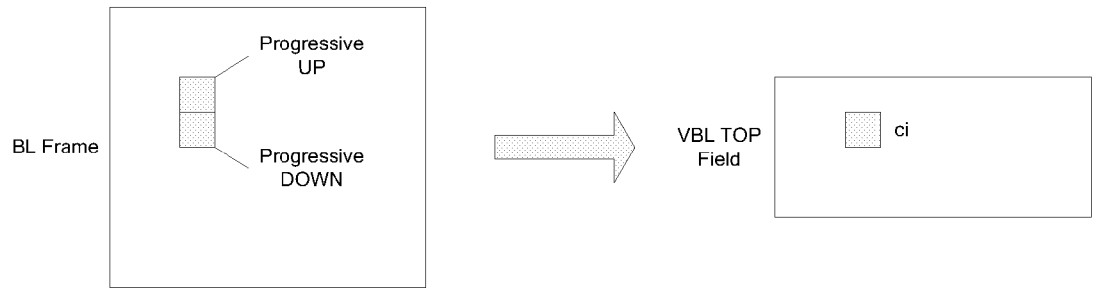
FIG. 3 illustrates the generation process of virtual base layer TOP and BOTTOM field macroblocks from base layer TOP and BOTTOM interlace pair of macroblocks.

The step 210 consists in generating the VBL MBs and more particularly in deriving motion data associated to the VBL MBs. VBL TOP MB is generated as follows depending on BL image coding mode:

IF BL image is coded as a Frame Image, then if BL MB positioned at (xi,2*yi) is progressive, the VBL TOP MB ci is a vertically downsampled version of the MB pair comprising the BL MB positioned at (xi,2*yi+1) and the BL MB positioned at (xi,2*yi). A new downsampling process is defined in the sequel to derive a vertically downsampled macroblock version of the pair of progressive macroblocks as depicted on FIG. 3 else if BL MB positioned at (xi,2*yi) is interlace, the motion data associated to VBL TOP MB ci is the copy of the motion data associated to TOP BL MB at position (xi,2*yi).

IF BL image is coded as a Field Image, the motion data associated to VBL TOP MB ci is the copy of the motion data associated to TOP BL MB at position (xi,yi).

Figure 4:
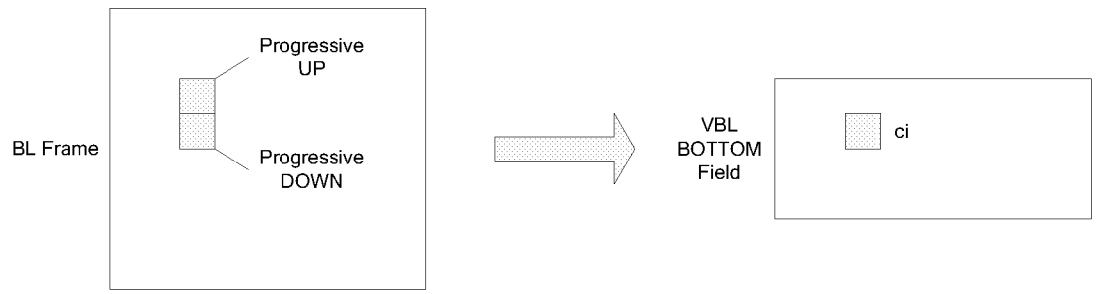
FIG. 4 illustrates UP and DOWN progressive macroblocks vertical downsampling process.

VBL BOTTOM MB is generated as follows depending on BL image coding mode:

IF BL image is coded as a Frame Image, then if BL MB positioned at (xi,2*yi+1) is progressive, the VBL BOTTOM MB ci is a vertically downsampled version of the MB pair comprising the BL MB positioned at (xi,2*yi+1) and the BL MB positioned at (xi,2*yi). It is generated using the new downsampling process as depicted on FIG. 4 else if BL MB positioned at (xi,2*yi+1) is interlace, the motion data associated to VBL BOTTOM MB ci is the copy of the motion data associated to BOTTOM BL MB at position (xi,2*yi+1).

IF BL image is coded as a Field Image, the motion data associated to VBL BOTTOM MB ci is the copy of the motion data associated to BOTTOM BL MB at position (xi,yi).

Figure 5:
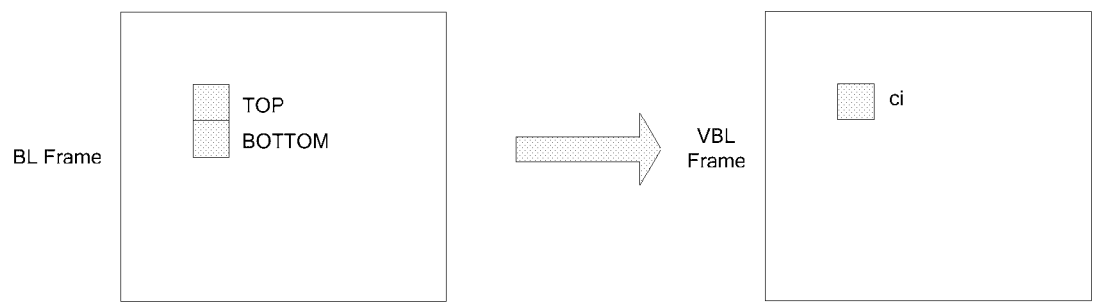
FIG. 5 illustrates TOP and BOTTOM macroblocks merging process.

VBL FRAME MB is generated as follows depending on BL image coding mode:

IF BL image is coded as a Frame Image, as depicted on FIG. 5, if BL MB positioned at (xi,yi) is progressive, then the motion data associated to the VBL Frame MB ci is a direct copy of the motion data associated to the BL MB positioned at (xi,yi) else if the BL MB positioned at (xi,yi) is interlace, the VBL Frame MB ci is a merged version of the MB pair comprising the BL MB positioned at (xi,yi) and the BL MB positioned at (xi,yi+1-2*(yi % 2)) A new merging process is defined in the sequel that allows to merge 2 macroblocks into a progressive macroblock In this case, the VBL Frame MBs UP and DOWN of a MB pair are identical because they are generated from the same TOP and BOTTOM BL MBs.

Figure 6:
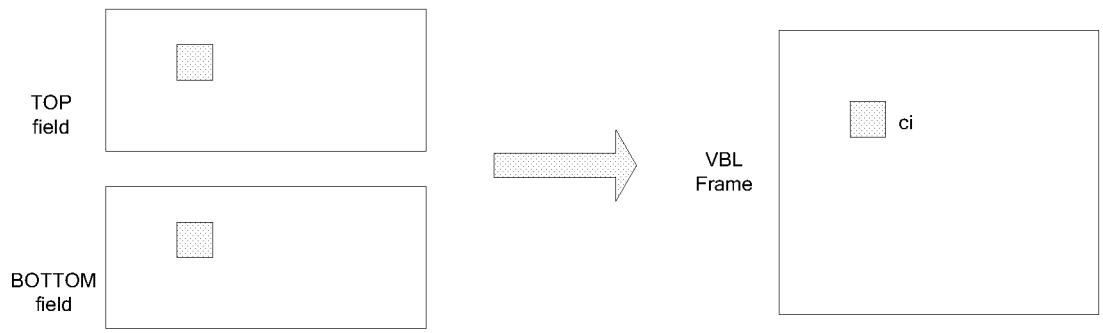
FIG. 6 illustrates interlace macroblock pair merging process.

IF BL image is coded as a Field Image, as depicted on FIG. 6,

VBL Frame MB ci is a merged version of BL TOP field MB at position (xi,yi/2) and BL BOTTOM field MB at position (xi,yi/2). This VBL Frame MB ci is generated using the new merging process.

The new downsampling process for deriving a vertically downsampled macroblock version of pairs of progressive macroblocks applies on a pair of BL macroblocks (UP and DOWN), at position (mbX, 2*mbY) and (mbX, 2*mbY+1), encoded in progressive format. It consists in a vertical downsampling by a ratio of 2 (one example is depicted on FIG. 7). The process outputs a downsampled macroblock at position (mbX, mbY).

Figure 7:
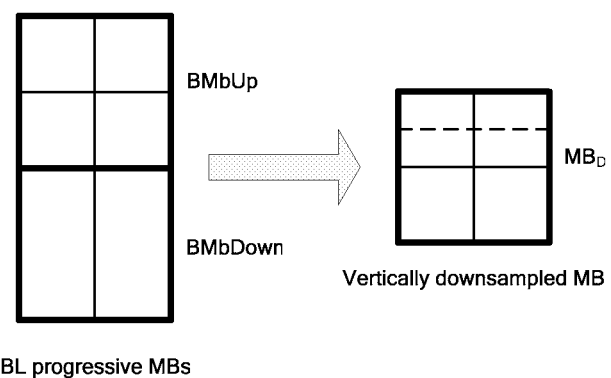
FIG. 7 illustrates progressive BL macroblocks (vertical) downsampling process.

As depicted in FIG. 7, each of the two BL UP and DOWN macroblocks generate a 16×8 partition after the vertical downsampling. So basically the vertically downsampled macroblock is split in two 16×8 partitions. The vertical downsampling process could generate configurations forbidden by MPEG-4 AVC standard, such as:

different reference indices inside 8×8 sub-partitions (for instance if one of the BL macroblocks is partitioned in four 8×8 blocks and if 2 neighboring up and down 8×8 blocks have not the same reference index then it would generate, once downsampled, an 8×8 block split into two 8×4 blocks having different reference indices); or sub-partitions with height of 2 pixels (for instance if an input 8×8 block is sub-partitioned in 8×4, it would generate once downsampled sub-partitions of size 8×2).

Figure 8:
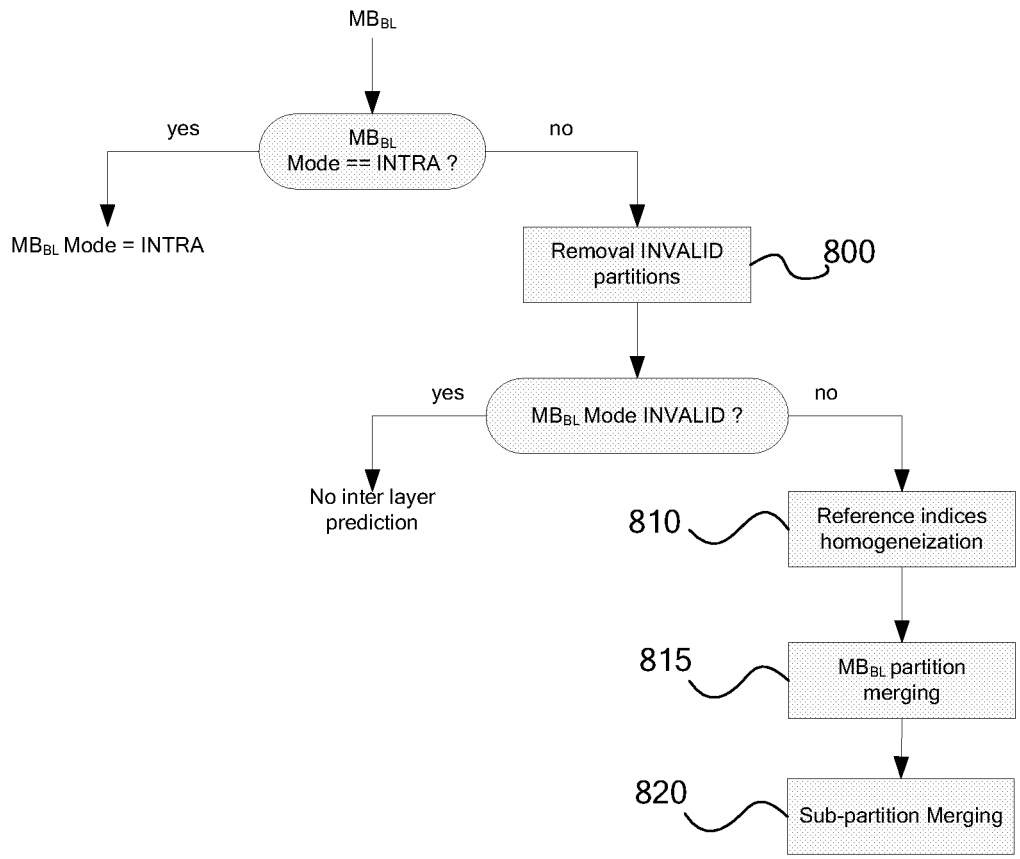
FIG. 8 depicts a block-diagram of BL progressive macroblocks cleaning process.

Therefore a cleaning process is first applied on the BL UP and DOWN MBs to avoid these configurations. Each macroblock of the pair of progressive BL macroblocks is first cleaned-up for avoiding partitions with invalid motion vectors. The process, depicted in FIG. 8 for one progressive BL macroblock noted $MB_{BL}$ applies successively on the UP and DOWN MB of the pair. It basically achieves the three following steps:

removal 800 of invalid partitions;
reference indices homogenization 810; and
merging 820 of 4×4 and 4×8 sub-partitions.

The step 800 consists in removing invalid partitions, i.e. those using invalid reference index, corresponding to reference field or frame not yet available in the decoding process.

If $MB_{BL}$ mode is not INTRA, the following process is applied:

For each list (0 and 1), the following applies:
First, partitions having an invalid reference index are classified as INVALID and other partitions are classified as VALID.

Then if at least one partition is VALID, then for each partition classified as INVALID, removal of invalid partitions is achieved. For instance, the sub-partitioning, motion vectors and reference index of a neighboring partition of the macroblock not classified as INVALID are copied to the INVALID partition. Neighboring partitions may be scanned in the following order: horizontal, vertical, diagonal. The partition is then classified as VALID.

If for both lists, all partitions are INVALID, $MB_{BL}$ mode is set to INVALID.

If $MB_{BL}$ mode is INTRA, then nothing is done.

The step 810, consists in homogenizing reference indices within $MB_{BL}$ partition. It applies only if $MB_{BL}$ mode is not set to INVALID.

If BL macroblock partition is equal to 16×8 or 8×8, the following process is applied for each up partition of the macroblock.
  If at least for one list (0 or 1), the down partition of the macroblock has a different reference index as its up partition, the following applies for each list/(0 and 1).
    the up or down partition using the minimum reference index rl is identified (noted refpart).
    The other partition is enforced to have the same reference index rl, sub-partitioning (if applicable) and motion vectors as refPart.

Possibly, at step 815, a partition merging process is applied. Partitions are merged into a single partition if they are not sub-partitioned and if for each list their reference index and motion vector are identical. Macroblock mode is modified as follows:
  16×8 and 8×16 are transformed into 16×16.
  8×8 is transformed as follows:
    8×16 if left 8×8 blocks are merged together and right 8×8 blocks are merged together;
    16×8 if up 8×8 blocks are merged together and down 8×8 blocks are merged together; and
    16×16 if the four 8×8 blocks are merged together.

The step 815 is optional.

Figure 9:
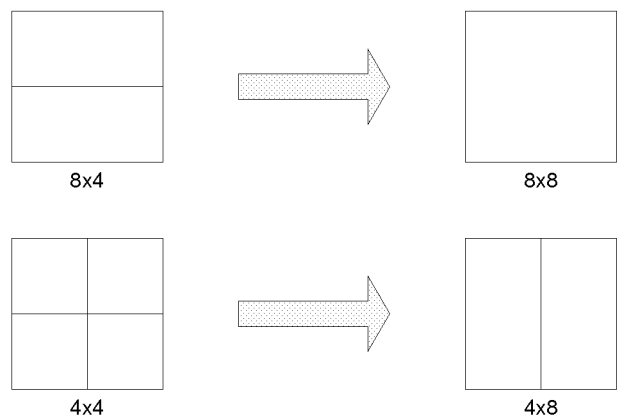
FIG. 9 illustrates 4×4 and 8×4 sub-partitions merging process.

The step 820 consists in merging 4×4 and 8×4 sub-partitions. It applies only if $MB_{BL}$ mode is not set to INVALID. If $MB_{BL}$ mode is neither equal to INVALID nor to INTRA and macroblock partition is equal to 8×8, sub-partitions merging is applied to each 8×8 block of the macroblock with sub-partitioning equal to 8×4 or 4×4. 8×4 sub-partitions are merged into 8×8 sub-partitions, and 4×4 sub-partitions are merged into 4×8 sub-partitions as depicted on FIG. 9. For each merged area, for each list (0 and 1), the merged area motion vector is set to the average motion vector of the two parts to be merged.

Figure 10:
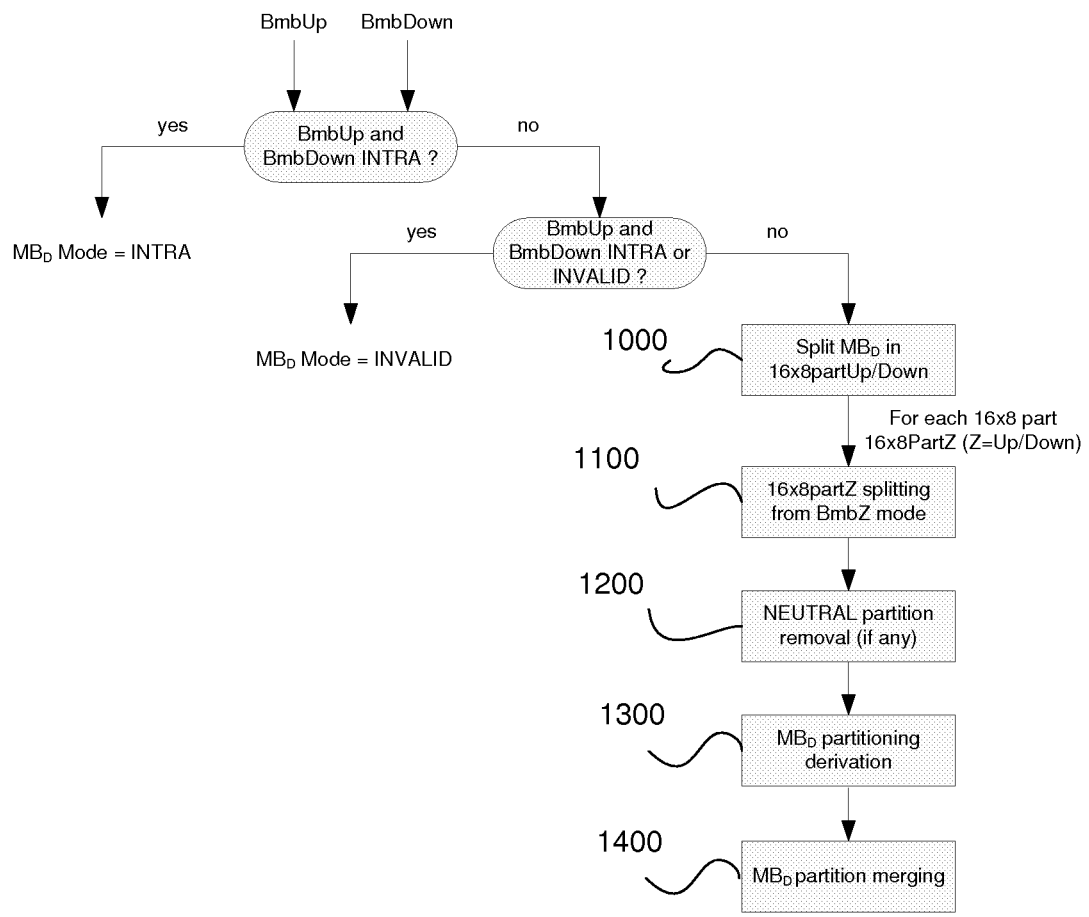
FIG. 10 depicts a block-diagram of downsampled macroblock derivation process.

After the cleaning process a downsampled macroblock named $MB_D$ is generated. It has two corresponding BL cleaned macroblocks, BMbUp and BMbDown. The FIG. 10 depicts the flowchart of the process applied to generate the downsampled macroblock $MB_D$.

If BMbUp and BMbDown are INTRA, $MB_D$ mode is set to INTRA.

Otherwise if BMbUp and BMbDown are INTRA or INVALID (three cases are considered here, BMbUp is INTRA and BMbDown is INVALID or BMbUp is INVALID and BMbDown is INTRA or both macroblocks BMbUp and BMbDown are INVALID), $MB_D$ mode is set to INVALID.

Otherwise, the following process applies:

At step 1000, $MB_D$ is split in two 16×8 parts (noted 16×8 PartUp and 16×8 PartDown in the sequel). Each 16×8 part has one corresponding BL frame macroblock (16×8 PartUp corresponds to BMbUp, 16×8 PartDown corresponds to BMbDown).

Figure 11:
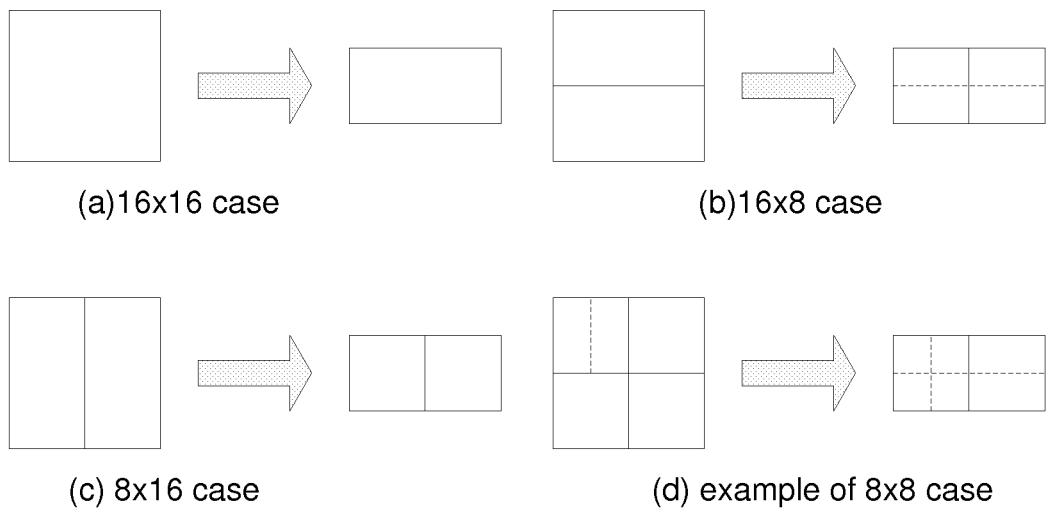
FIG. 11 illustrates different vertical downsampling cases.

At step 1200, each 16×8 part 16×8 PartZ (with Z being replaced by Up or Down) is built using the following process (illustrated in FIG. 11).
  if BMbZ is INVALID or INTRA, 16×8 PartZ is classified as NEUTRAL.
  otherwise if BMbZ partition is 16×16, 16×8 PartZ partition is 16×8 (FIG. 11 a). For each list, 16×8 PartZ reference index is those of BMbZ.
  otherwise 16×8 PartZ partition is 8×8. The two 8×8 blocks of 16×8 PartZ are then sub-partitioned as follows.
    if BMbZ partition is 16×8, sub-partitioning is 8×4 for both blocks (FIG. 11b).
    otherwise if BMbZ partition is 8×16, sub-partitioning is 8×8 for both blocks (FIG. 11c).
    otherwise if BMbZ partition is 8×8, for W being replaced by left and right, the following applies (example in FIG. 11d).
      if at least one of the W BMbZ 8×8 blocks is split in 4×8, the W 8×8 block sub-partitioning is 4×4.
      otherwise the W 8×8 block sub-partitioning is 8×4.
  Each derived partition/sub-partition of 16×8 PartZ inherits its reference indices and motion vectors as follows.
    The top left 4×4 block coordinates (b4X,b4Y) of the considered partition/sub-partition are identified.
    The reference indices and motion vectors of the 4×4 block of BMbZ with coordinates (b4X, b4Y/2) are copied to the considered partition/sub-partition.

The step 1200, consists in removing NEUTRAL partition if any. If one of the two 16×8 parts is classified as NEUTRAL, its content (partitioning/sub-partitioning, reference indices and motion vectors) is copied from the other 16×8 part content.

The step 1300, consists in deriving $MB_D$ partitioning as follows:
  If 16×8 PartUp and 16×8 PartDown partitions are 16×8, $MB_D$ partitioning is 16×8
  Otherwise, $MB_D$ partitioning is set to 8×8.

Possibly, at step 1400, the partition merging process of step 815 is applied. This step 1400 is optional.

Figure 12:
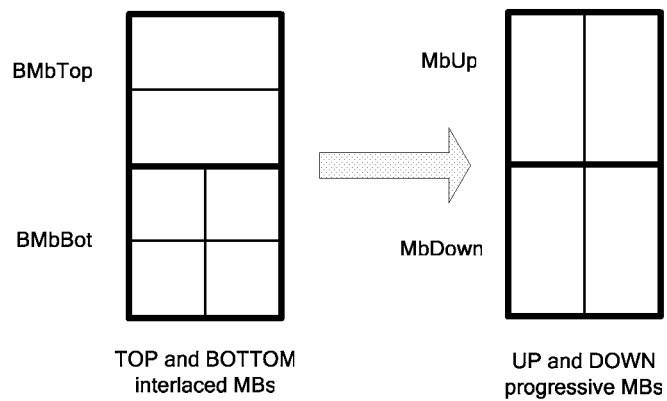
FIG. 12 illustrates interlace BL TOP and BOTTOM macroblocks merging process.
Figure 13:
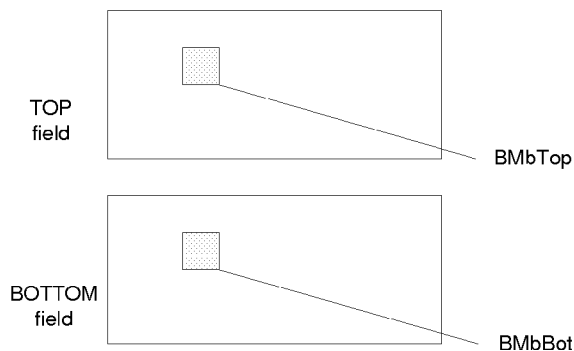
FIG. 13 illustrates TOP and BOTTOM macroblocks in field image.
Figure 14:
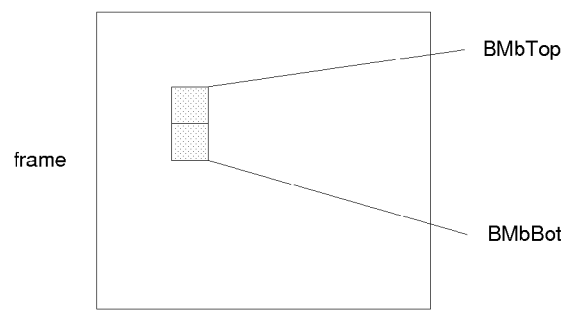
FIG. 14 illustrates TOP and BOTTOM macroblocks in frame image (MBAFF)

The new merging process for merging a TOP macroblock (i.e. coming from BL TOP field) and a BOTTOM macroblock (i.e. coming from BL BOTTOM field) into a pair of progressive macroblocks (UP and DOWN) applies to two BL macroblocks encoded in interlaced format. The first considered macroblock is a TOP macroblock BMbTop. The second one is a BOTTOM macroblock BMbBot. The output of the process is a pair of progressive UP and DOWN macroblocks as depicted on FIG. 12. BMbTop and BMbBot are defined as follows:
  if BL image is encoded as a Field image, BMbTop is the macroblock of BL TOP field and BMbBot is the macroblock of BL BOTTOM field at position (mbX, mbY) as depicted on FIG. 13;
  otherwise (BL image is encoded as a FRAME image), BMbTop and BMbBot are macroblocks of BL Frame at position (mbX, 2*mbY) and (mbX, 2*mbY+1)—this only applies if the BL Frame macroblocks pair is encoded in interlace mode as depicted on FIG. 14.

Figure 15:
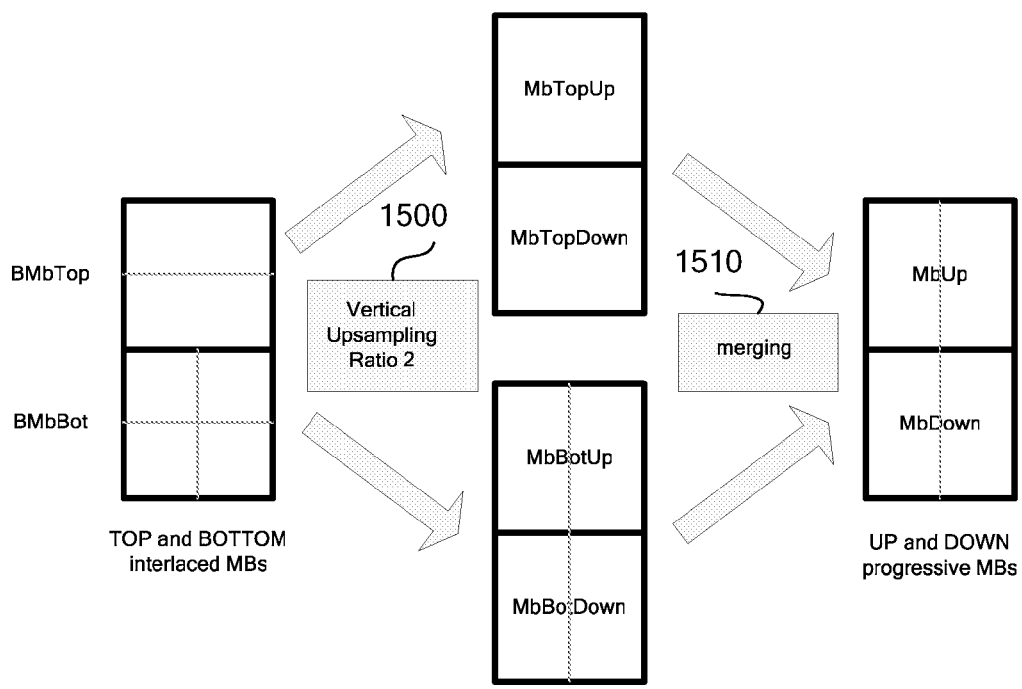
FIG. 15 illustrates the two steps of interlace TOP and BOTTOM macroblocks merging process.

In reference to FIG. 15, the process comprises the two following steps:
  a step 1500 for vertical upsampling of BMbTop and BMbBot with a ratio of 2, this step generating two upsampled TOP macroblocks, namely MbTopUp and MbTopDown, and two upsampled BOTTOM macroblocks, namely MbBottomUp and MbBottomDown.
  A step 1510 for merging the upsampled macroblocks MbTopUp and MbBottomUp into one macroblock MbUp, and the upsampled macroblocks MbTopDown and MbBottomDown into one macroblock MbDown.

The step 1500 consists in macroblock upsampling with a ratio 2 in the vertical direction. This step consists in applying directly the ESS upsampling process defined in JSVM4 (Joint Video Team (JVT) of ISO/IEC MPEG & ITU-T VCEG JVT-Q202, "Scalable Video Coding—Joint Draft 4", J. Reichel, H. Schwarz, M. Wien) with a ratio of 1 in the horizontal direction and a ratio of two in the vertical direction.

The step 1510 applies on two macroblocks MbIn1 and MbIn2 and generates one merged macroblock MbOut. In reference to FIG. 15, if the macroblocks MbIn1 and MbIn2 refer to macroblocks MbTopUp and MbBotUp respectively then MbOut refers to MbUp and if the macroblocks MbIn1 and MbIn2 refer to macroblocks MbTopDown and MbBot-Down respectively then MbOut refers to MbDown.

According to a first embodiment, MbIn1 associated motion data is associated to MbOut.

If MbOut is not INTRA, the invalid partitions are removed by the invalid partitions removal process described previously;

If MbOut is classified INVALID, MbIn2 associated motion data is associated to MbOut. Then the following process applies If MbOut is not INTRA, the invalid partitions are removed by the invalid partitions removal process described previously.

Figure 16:
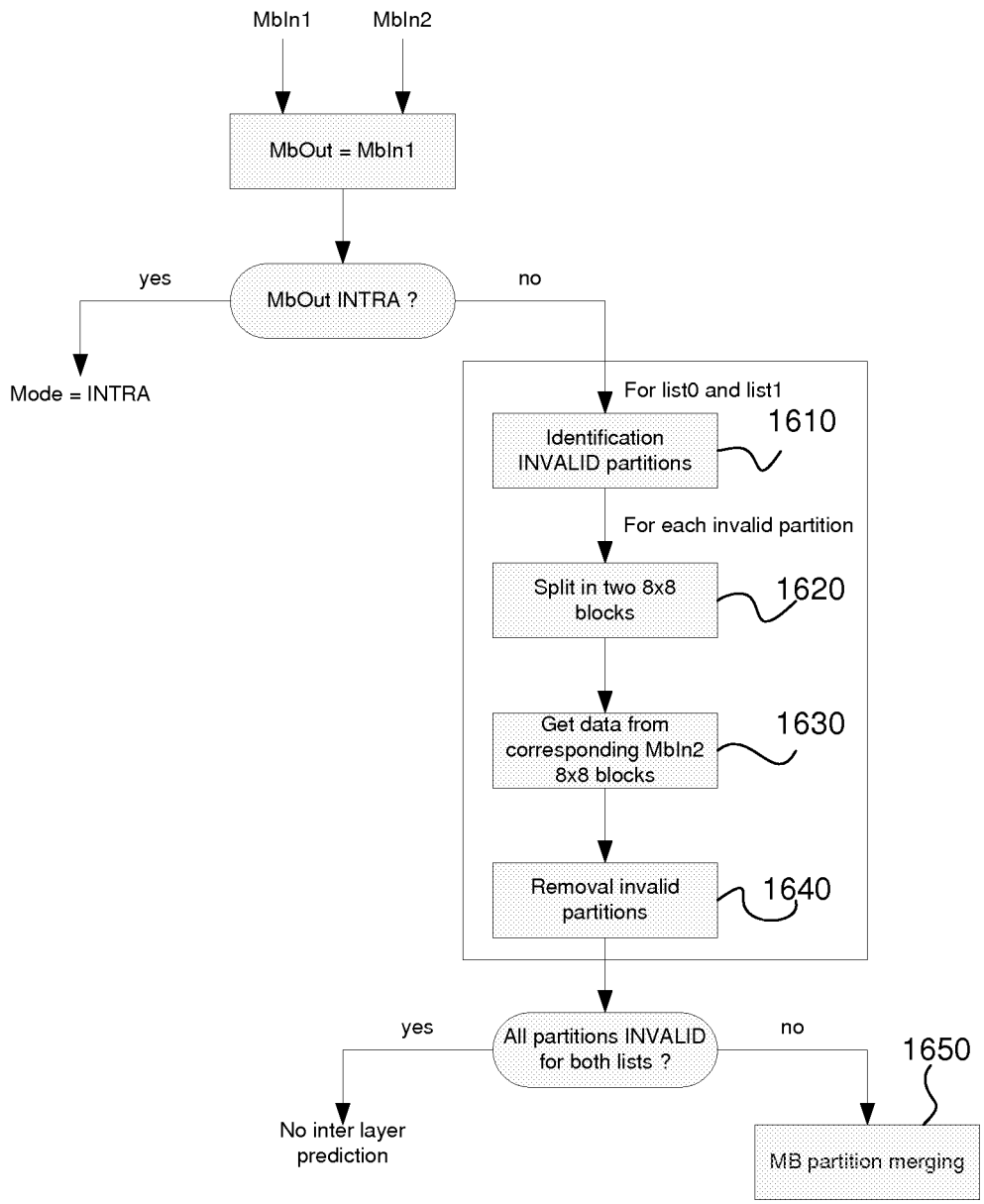
FIG. 16 depicts a block-diagram of upsampled macroblocks content merging process.

According to a preferred embodiment, in reference to FIG. 16, the step 1510 consists in applying the following sub-steps:

At sub-step 1600, MbIn1 associated motion data is associated to MbOut. Then, If MbOut is not INTRA, the following process applies:

For each list (0 and 1), the following applies:

At sub-step 1610, partitions having an invalid reference index are classified as INVALID and other partitions are classified as VALID. INVALID partitions are processed as follows:

At sub-step 1620, MbOut partitioning is enforced to 8×8. The INVALID partition is divided in 8×8 partitions. MbOut mode is enforced to 8×8. For each 8×8 partition, the following applies:

At sub-step 1630, if the corresponding 8×8 block in MbIn2 uses a valid reference index, sub-partitioning (if any), reference index and motion vectors of this MbIn2 8×8 block are copied into the considered MbOut 8×8 partition. This partition is classified as VALID. Otherwise, the MbOut 8×8 partition is classified as INVALID.

If at least one MbOut 8×8 partition is VALID, then, at sub-step 1640, for each partition classified as INVALID, removal of invalid partitions is achieved. For instance the sub-partitioning, motion vectors and reference index of a neighboring partition of the macroblock not classified as INVALID are copied to the INVALID partition. Neighboring partitions may be scanned in the following order: horizontal, vertical, diagonal. The partition is then classified as VALID.

If for both lists, all partitions are INVALID, mode is set to INVALID.

At sub-step 1650, MbOut partitions may be merged by applying the partition merging process of step 815. This sub-step 1650 is optional.

In FIGS. 2, 8, 10 and 16, the represented boxes are purely functional entities, which do not necessarily correspond to physical separated entities. Namely, they could be developed in the form of software, or be implemented in one or several integrated circuits.

The method for generating inter-layers motion predictors may be used of a process for coding video signals and of a process for coding video signals as the one described in JSVM4.

Figure 19:
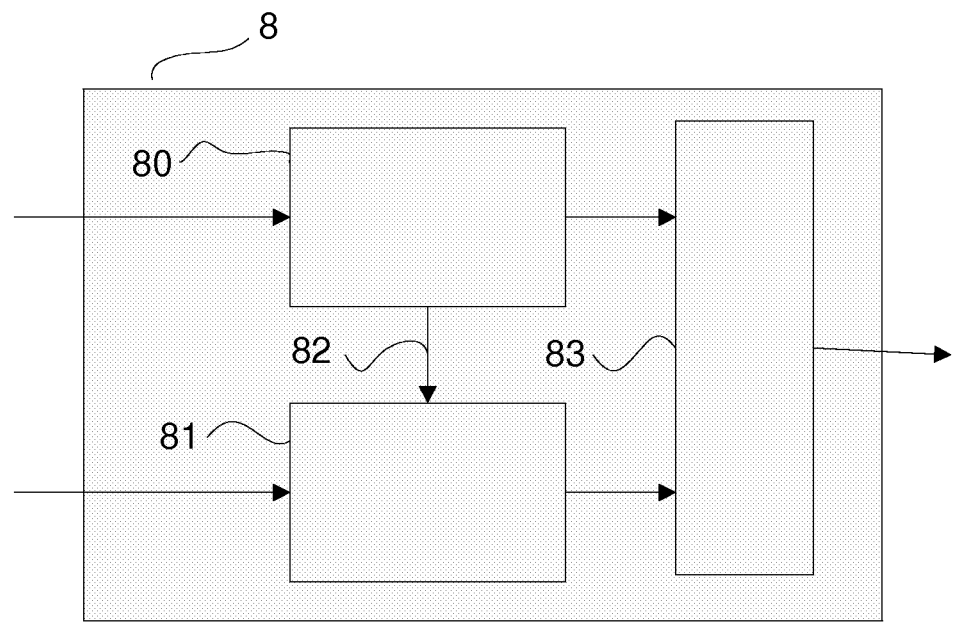
FIG. 19 depicts a encoding device according to the invention.

The invention also concerns a coding device 8 depicted on FIG. 19. The coding device 8 comprises a first coding module 80 for coding the low resolution images. The module 80 generates a base layer data stream and motion data for said low resolution images. Preferentially the module 80 is adapted to generate a base layer data stream compatible with MPEG4 AVC standard. The coding device 8 comprises inheritance means 82 used to derive motion data for high resolution images from the motion data of the low resolution images generated by the first coding module 80. The inheritance means 82 are adapted to implement the steps 200 to 220 of the method according to the invention. The coding device 8 comprises a second coding module 81 for coding the high resolution images. The second coding module 81 uses the motion data derived by the inheritance means 82 in order to encode the high resolution images. The second coding module 81 thus generates an enhancement layer data stream. Preferentially, the coding device 8 also comprises a module 83 (for example a multiplexer) that combines the base layer data stream and the enhancement layer data stream provided by the first coding module 80 and the second coding module 81 respectively to generate a single data stream. Therefore, if a EL MB is encoded by the second coding module 81 using the inter-layer prediction mode, the motion data related to said EL MB are not coded in the data stream (or only partly coded since quarter-pel motion refinement may possibly be coded) since they are derived from the motion data related to the BL MBs that are provided by the module 80. This allows to save some bits. On the other hand, if a EL MB is encoded using a classical mode (e.g. bidirectional mode) then motion data related to said EL MB are coded in the data stream.

Figure 20:
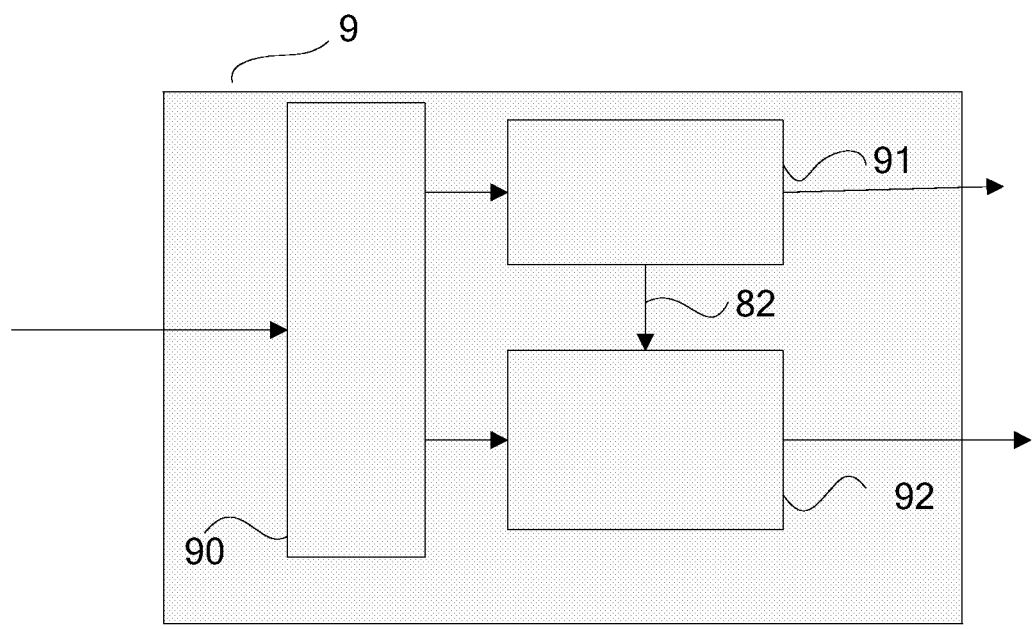
FIG. 20 depicts a decoding device according to the invention.

The invention also concerns a decoding device 9 depicted on FIG. 20 for decoding high resolution images from a data stream generated for example with the coding device 8. The decoding device 9 comprises a first decoding module 91 for decoding a first part of the data stream, called base layer data stream, in order to derive low resolution images and motion data for said low resolution images. Preferentially the module 91 is adapted to decode a data stream compatible with MPEG4 AVC standard. The decoding device 9 comprises inheritance means 82 used to derive motion data for high resolution images from the motion data of the low resolution images generated by the first decoding module 91. The inheritance means 82 are adapted to implement the steps 200 to 220 of the method according to the invention. The decoding device 9 comprises a second decoding module 92 for decoding a second part of the data stream, called enhancement layer data stream. The second decoding module 92 uses the motion data derived by the inheritance means 82 in order to decode a second part of the data stream. The second decoding module 92 thus generates the high resolution images. Advantageously, the device 9 comprises also an extracting module 90 (e.g. a demultiplexer) for extracting from the received data stream the base layer data stream and the enhancement layer data stream.

According to another embodiment the decoding device receives two data streams: a base layer data stream and an enhancement layer data stream. In this case the device 9 does not comprise an extracting module 90.

The invention claimed is:

1. Method as part of a process of scalable video coding or decoding for generating, in a scalable video encoder or decoder, for at least one macroblock of a high resolution image, called high resolution macroblock, at least one motion predictor from motion data associated with macroblock(s) of a low resolution image, called low resolution macroblock(s), comprising the following steps:

defining a virtual structure made up of non overlapping macroblocks, called virtual base layer macroblocks, said virtual structure having same dimensions as said low resolution image;

identifying, for said high resolution macroblock, corresponding virtual base layer macroblocks in said virtual structure on the basis of the location of said high resolution macroblock within said high resolution image and on the basis of the ratios of low resolution and high resolution images dimensions;

associating with each identified virtual base layer macroblocks motion data, said motion data being converted from motion data associated with at least one macroblock of a corresponding low resolution macroblocks pair on the basis of the field/frame mode of said corresponding low resolution macroblocks pair and on the basis of the field/frame mode of said high resolution macroblock so that said converted motion data is compatible with the field/frame mode of said high resolution macroblock;

resampling motion data associated with said corresponding virtual base layer macroblocks so as to generate said at least one motion predictor.

2. Method according to claim 1, wherein, when said high resolution macroblock is in frame mode and when said corresponding low resolution macroblocks pair is in field mode, the step of associating comprises the steps of:

upsampling vertically by a ratio of two said low resolution macroblocks pair made up of a top macroblock and a bottom macroblock, each upsampled macroblock being made up of an up part and a down part; and merging motion data of the up part of the upsampled top macroblock with motion data of the up part of the upsampled bottom macroblock and merging motion data of the down part of the upsampled top macroblock with motion data of the down part of the upsampled bottom macroblock.

3. Method according to claim 1, wherein, when said high resolution macroblock is in field mode and when said corresponding low resolution macroblocks pair is in frame mode, said low resolution macroblocks pair being made up of a top macroblock and a down macroblock, the step of associating comprises the steps of:

splitting said identified virtual base layer macroblock into a top 16 by 8 part and a down 16 by 8 part, said top 16 by 8 part corresponding to the top macroblock of the corresponding low resolution macroblocks pair and said down 16 by 8 part corresponding to the down macroblock of the corresponding low resolution macroblocks pair; and for each of said 16 by 8 part of said identified virtual base layer macroblock:

if corresponding macroblock of said low resolution macroblocks pair is partitioned into a 16 by 16 part, then partition of said 16 by 8 part is 16 by 8, otherwise partition of said 16 by 8 part is 8 by 8 and each 8 by 8 part are further subpartitioned as follows:

if corresponding macroblock of said low resolution macroblocks pair is partitioned into two 16 by 8 parts, then 8 by 8 part is subpartitioned into 8 by 4 parts;

if corresponding macroblock of said low resolution macroblocks pair is partitioned into two 8 by 16 parts, then 8 by 8 part is subpartitioned into 8 by 8 subparts;

otherwise if corresponding macroblock of said low resolution macroblocks pair is partitioned into four 8 by 8 parts, then if at least one of said 8 by 8 parts of said macroblock of said low resolution macroblocks pair corresponding to said 8 by 8 part is split in two 4 by 8 parts, then said 8 by 8 part is subpartitioned into 4 by 4 subparts, otherwise said 8 by 8 part is subpartitioned into 8 by 4 subparts, associating with each partition or subpartition of said identified virtual base layer macroblock, reference indices and motion vectors of a 4 by 4 block of said corresponding macroblock of said low resolution macroblocks pair whose coordinates equals b4X and b4Y/2, where b4X and b4Y are the coordinates of the top left 4 by 4 block of the considered partition or subpartition.

4. Device for scalable coding a sequence of high resolution images made up of macroblocks, called high resolution macroblocks, and a sequence of low resolution images, called low resolution macroblocks, said device comprising:

a first coding module configured to code said low resolution images, said first coding module generating motion data for macroblocks of said low resolution images and a base layer data stream;

inheritance means configured to derive motion data for at least one macroblock of a high resolution image, called high resolution macroblock from motion data of macroblocks a low resolution image, called low resolution macroblocks; and a second coding module configured to code said high resolution images using said derived motion data, said second coding module generating an enhancement layer data stream;

wherein the inheritance means are configured to:

define a virtual structure made up of non overlapping macroblocks, called virtual base layer macroblocks, said virtual structure having same dimensions as said low resolution image;

identify, for said high resolution macroblock, corresponding virtual base layer macroblocks in said virtual structure on the basis of the location of said high resolution macroblock within said high resolution image and on the basis of the ratios of low resolution and high resolution images dimensions;

associate, with each identified virtual base layer macroblocks, motion data converted from motion data associated with at least one macroblock of a corresponding low resolution macroblocks pair on the basis of the field/frame mode of said corresponding low resolution macroblocks pair and on the basis of the field/frame mode of said high resolution macroblock so that said converted motion data is compatible with the field/frame mode of said high resolution macroblock; and resample motion data associated with said corresponding virtual base layer macroblocks so as to generate said at least one motion predictor.

5. Device according to claim 4, wherein said first coding means are an MPEG-4 AVC video encoder.

6. Device for scalable decoding at least a coded sequence of high resolution images, the coded images arising in the form of a data stream, each image being divided in non overlapping macroblocks, said device comprising:

a first decoding module configured to at least a first part of said data stream in order to generate low resolution images and motion data for macroblocks of said low resolution image;

inheritance means for deriving associating motion data for at least one macroblock of a high resolution image from motion data of macroblocks of a low resolution image; and a second decoding module configured to decode at least a second part of said data stream using said derived motion data in order to generate high resolution images;

wherein the inheritance means are configured to:

define a virtual structure made up of non overlapping macroblocks, called virtual base layer macroblocks, said virtual structure having same dimensions as said low resolution image;

identify, for said high resolution macroblock, corresponding virtual base layer macroblocks in said virtual structure on the basis of the location of said high resolution macroblock within said high resolution image and on the basis of the ratios of low resolution and high resolution images dimensions;

associate, with each identified virtual base layer macroblocks, motion data converted from motion data associated with at least one macroblock of a corresponding low resolution macroblocks pair on the basis of the field/frame mode of said corresponding low resolution macroblocks pair and on the basis of the field/frame mode of said high resolution macroblock so that said converted motion data is compatible with the field/frame mode of said high resolution macroblock; and resample motion data associated with said corresponding virtual base layer macroblocks so as to generate said at least one motion predictor.

7. Device according to claim 6, wherein said first decoding means are an MPEG-4 AVC video decoder.

8. Method according to claim 2, wherein the merging step comprises the step of associating an identified up virtual base layer macroblock of a virtual base layer macroblock pair with the motion data of the up part of the upsampled top macroblock and associating an identified down virtual base layer macroblock of a virtual base layer macroblock pair with the motion data of the down part of the upsampled top macroblock.

9. Method according to claim 8, wherein the merging step comprises the step of associating an identified up virtual base layer macroblock with the motion data of the up part of the upsampled top macroblock and associating an identified down virtual base layer macroblock with the motion data of the down part of the upsampled top macroblock and further comprising the step of:

identifying, for each of said up and down virtual base layer macroblocks, partitions of said identified virtual base layer macroblock having an invalid reference index;

partitioning said identified virtual base layer macroblock having an invalid reference index into 8 by 8 parts, associating, for each 8 by 8 part of said identified virtual base layer macroblock, the motion data of the corresponding 8 by 8 part of the upsampled down macroblock if said 8 by 8 part has a valid reference index, associating with the remaining 8 by 8 parts of said identified virtual base layer macroblock having an invalid reference index motion data of a neighboring 8 by 8 part having a valid reference index.

* * * * *